United States Patent Office 3,609,807
Patented Oct. 5, 1971

3,609,807
ROTARY PLATE EXTRUDING MACHINE
Bernard Neuville, Versailles, and Raoul Hess, Chatillon-sous-Bagneux, France, assignors to Sidel, Société Anonyme, Le Havre, France
Filed Aug. 4, 1969, Ser. No. 847,355
Claims priority, application France, Sept. 2, 1968, 164,842
Int. Cl. B29f 1/02
U.S. Cl. 18—12 C                                 2 Claims

ABSTRACT OF THE DISCLOSURE

Extruder comprising a plate rotatably driven about its axis and registering with a stationary or stator plate, said rotary plate and said stationary plate carrying at least one circular set of blades and forming therebetween a gap into which the material to be worked is fed, a cavity formed in the central portion of said stator plate, said cavity registering with a central projection formed on said rotary plate, and a die mounted in said central cavity of the stator plate, characterized in that there is mounted in the central cavity of said stator plate at least one propeller comprising a plurality of blades which has the same axis as said rotor, and that means are provided for rotatably driving said propeller, the propeller blades being inclined with a view to force the material to be extruded towards said die during the rotation of said propeller.

BACKGROUND OF THE INVENTION

The present invention relates to improvements in rotary-plate extruders, with a view to enable these machines to exert a proper pressure on the material to be extruded and thus obtain adequately extruded articles therefrom.

These rotary-plate extruders comprise essentially a plate adapted to revolve about its axis while shearing the extrusion material between on the one hand one or both faces of said plate and, on the other hand, one or two stationary surfaces parallel to the face or faces of said movable plate, the gap left between two registering surfaces being only a few millimeters. The scope of these extruders is to gel and homogenize within a relatively short lapse of time the material to be transformed, notably thermoplastic materials such as polyvinyl chloride.

These machines are generally objectionable on account of the relatively low pressures obtaining downstream of the extrusion nozzle. Now it is known that to obtain a proper shaping of the extruded material the die fitted to the outlet thereof must have a sufficient length. In this case the extruder must develop a certain pressure in order to force the material through the die.

To meet this requirement it has already been proposed to secure a screw centrally of the movable or rotary plate of the extruder and thus develop at the input end of the die pressures comparing with those produced in conventional screw extruding machines. However, in this case the inconveniences characterizing screw or worm extruders, namely an abnormally high friction in in the bottom of the screw threads, a poor global homogenization of the material and the risk of decomposing same, are observed.

SUMMARY OF THE INVENTION

It is the essential object of the present invention to avoid these inconveniences. To this end, the invention provides an extruder comprising a plate rotatably driven about its axis and mounted in front of a stationary or stator plate, the rotary plate and the stationary plate carrying at least one circular set of blades, and forming therebetween a gap into which the material to be worked and extruded is fed; a cavity formed in said stator, in the central portion thereof, which registers with a central projection of the rotary plate, and a die mounted in said central cavity of said stator, characterized in that at least one multi-blade propeller is rotatably mounted in the central cavity of the stator, this propeller being coaxial to said stator, and that means are provided for rotatably driving said propeller, the blades thereof being inclined in the direction required for forcing the material to be extruded towards the die during the rotation. The propeller or propellers may be rigid either with the movable plate or with a separate driving device.

A priori, it seems rather surprising that the helix or propeller principle can be embodied efficiently for accelerating the flow of such high-viscosity products as molten high-polymers having on the other hand a considerable elasticity. The applicants observed that the velocity of rotation of the propeller exerts a considerable influence on rotary-plate extruders equipped therewith, and that very satisfactory outputs are obtained at relatively high propeller speeds; particularly advantageous speeds are in excess of 100 r.p.m. These speeds, seldom encountered in conventional screw extruders, especially in the extrusion of non-plastified PVC, cannot give high yields without degradating the plastic material, unless rotary plate extruders capable of attaining these high speeds without difficulty and producing a complete melting of the material are used.

Another advantageous feature characterizing the use of propeller v. screw is its reduced axial length. Since it is neither necessary nor in many cases desirable to provide very long blades (since the compression gain does not justify the temperature increment in the material which is caused by this additional friction), relatively short blades can be used and therefore the volume of material contained therein remains relatively small, thus tending to reduce the time period during which the material is necessarily kept at high temperature.

In order to reinforce the helix effect exerted on the flow of molten high polymers, it is advantageous to associate a set of counter-blades with the helix of the propeller, in the vicinity and preferably on the upstream side thereof, the number of counter-blade sets corresponding or not to that of the helices.

This counter-blade set may consist more particularly of blades properly oriented in relation to the machine axis and rigid with the stationary plate of the extruder, notably through the medium of a ring-shaped member disposed about the extrusion duct and fitted in the stationary plate upstream of each propeller.

By properly modifying the geometrical configuration of these blades, whether movable or stationary, and notably their radial length, axial length, profile and orientation, and by altering their number, notably the number of blades per propeller, it is possible to produce very different effects permitting of adapting the machine to the different plastic materials which it is normally expected to work.

The propeller and counter-blade systems according to this invention may be mounted on the different types of rotary-plate extruders known in the industry of extruded plastics. These systems are particularly adequate for rotary-plate extruders wherein the rotor and stator comprise one or more sets of blades. In this last case it may be advantageous to equip the movable plate with small additional blades disposed on the rotor projection just upstream of the propeller and counter-blade systems.

The propeller or propellers independent of the movable plate may be driven very simply by means of a shaft extending through said movable plate and connected to a device adapted to impart the desired movement of rotation thereto, the rotary plate itself being driven with the requisite motion through a system of rollers or gears engaging its outer periphery, or through gearings or pulleys of which one element is concentric to said rotary plate.

The hub or hubs carrying said propellers are preferably hollow and adapted to permit the circulation of a cooling or thermostatically controlled fluid.

BRIEF DESCRIPTION OF THE DRAWING

Various forms of embodiment of this invention will now be described by way of example with reference to the attached drawing, in which.

DESCRIPTION OF THE PREFERRED EMBODIMENT

Figure 1:
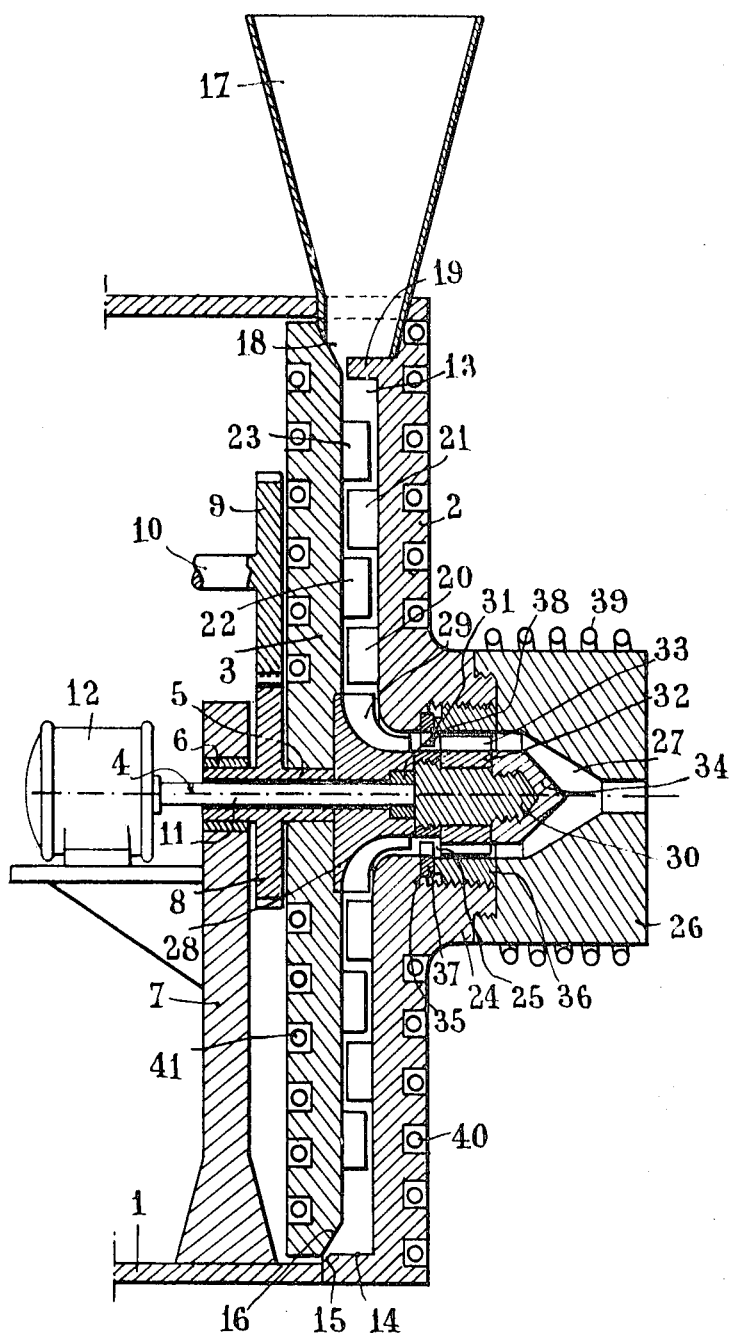
FIG. 1 is an axial and vertical fragmentary section showing a rotary-plate extruder comprising a single propeller independent of said plate, and a single set of counter-blades.

Referring now to FIG. 1, it will be seen that the front horizontal portion 1 of the frame structure of a rotary-plate extruding machine has mounted to its end a vertical stationary plate or stator 2. Parallel to and closely spaced from this stationary plate 2 is a rotary plate or rotor 3 having a horizontal axis 4. The rotary plate 3 is rigid with a hollow shaft 5 journalled in a bearing 6 carried by an upright or bracket 7 rigid with and extending externally of the frame structure 1. The hollow shaft 5 is also rigid with a pinion 8 constantly meshing with a driving pinion 9 rigid in turn with a power shaft 10. This power shaft 10 is rotatably driven from a motor (not shown), possibly through the medium of a variable-speed gearing.

Within the hollow shaft 5 and concentrically thereto is a cylindrical rod 11 mounted in smooth frictional contact by means of suitable bearings. This cylindrical rod 11 is rotatably driven through suitable means, such as a motor shown diagrammatically at 12. A self-lubricating ring (such as a polytetrafluoroethylene ring) seals the rod 11.

The stationary plate or stator 2 is hollowed on its inner face to provide a cavity 13 bounded laterally by a substantially cylindrical wall 14 eccentric in relation to the axis 4 of rotor 3 and of smaller radius than this rotor. The projecting edges of rotor 3 and stator 2 are bevelled and the resulting inclined surfaces fit against each other without any frictional contact but with the minimum clearance therebetween; the axis of the frusto-conical surfaces thus obtained merges into that of rotor 3.

A feed hopper 17 is secured to the outermost and uppermost portions of the eccentric cavity 13 formed between the stator 2 and rotor 3, which may also be referred to as the gap, the outlet aperture 18 of hopper 17 opening into said gap 13 and being partly bounded by an extension 19 of the gap edge.

A pair of circular sets of fixed blades 20 and 21 are secured to the inner face of stator 2 and on the other hand another pair of sets of movable blades 22 and 23 are secured to the registering face of rotor 3, these blades extending in alternate relationship in the radial direction.

The central portion of stator 2 comprises an extension 24 constituting an outer projection forming a cylindrical cavity 25 coaxial to said rotor axis 4. Secured to the inner extension 24 is an external die 26 of which the inner cavity 27 is connected to said cavity 25.

The rotor 3 carries in its central portion a hub or like projection 28 in which small blades 29 are provided, this projecting hub slightly engaging the aforesaid cylindrical cavity 25 of the external extension 24 of stator 2.

A core 30 is mounted adjacent the central hub 28 and rigid with the rod 11. This rod 11 is journalled in the rotor by engaging a bearing 31 mounted in the bore of hub 28 at the end thereof. The core 30 carries a single propeller 32 comprising five blades 33 and this propeller is locked to the core 30 by means of an internally screw-threaded cap 34 screwed on the screw-threaded end of said core 30 and acting as a lock nut.

Besides, a set of counter-blades 35 is secured to the extension 34 of stator 2 by means of a screw-threaded ring 36 engaging an internally screw-threaded bore provided to this end in said extension. The set of counter-blades 35 is disposed between the end of hub 28 and the propeller 32, and comprises a ring 37 from which small inclined blades 38 extend towards the axis.

Means are provided for heating the die 26 and controlling the temperature of rotor 3 and stator 2. These means consist for example of a coil pipe 39 surrounding the die 26, another coil pipe 40 housed within the stator 2 and a further coil pipe 41 housed within the rotor 3. A thermostatically controlled fluid is circulated through these coil pipes. If desired, electrical heating resistances may be substituted therefor, and in this case thermocouple means and adequate and known regulation means (not shown) are associated with the resistances.

In the above-described form of embodiment of the invention the propeller 32 is driven from the motor 12 via rod 11 independently of the rotation of rotor 3. The results obtained with an extruding machine of this type are given in a later part of this description.

Figure 2:
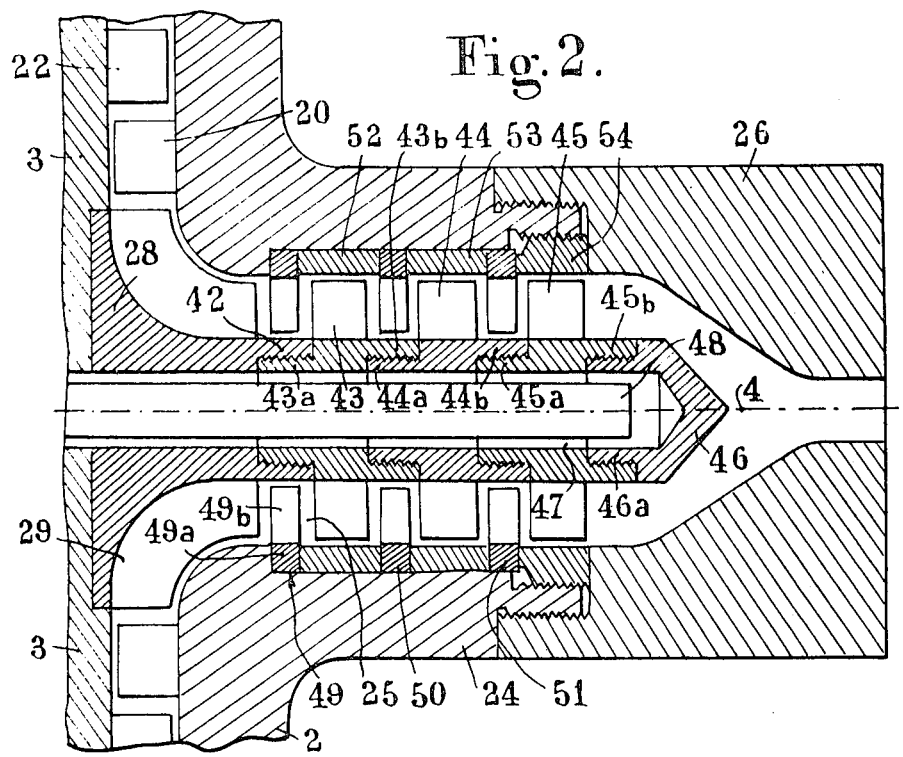
FIG. 2 is a fragmentary axial section showing on a larger scale a modified form of embodiment of the outlet of a rotary-plate extruder, to illustrate the mounting of three propeller stages on the projection of the rotary plate or rotor and of three sets of counter blades on the stationary plate or stator.
Figures 5, 6:
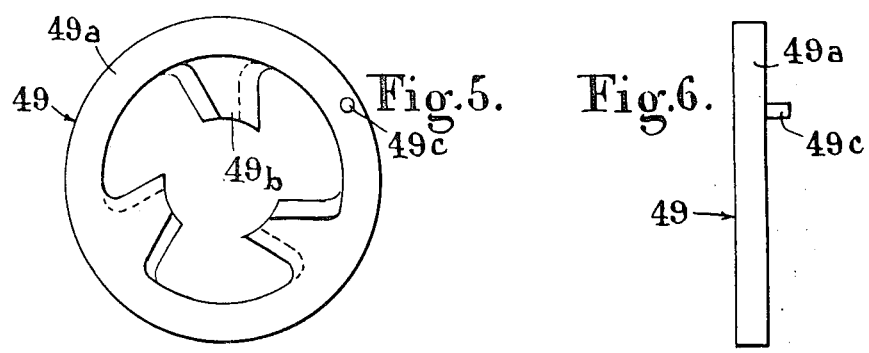
FIG. 5 is a front view showing a counter-blade assembly consisting of three fixed blades mounted on a ring member.
FIG. 6 is a side elevational view of the counter-blade set shown in FIG. 5.

Now reference will be made more particularly to FIGS. 2 and 6 illustrating a modified form of embodiment of the invention, wherein a plurality of propellers are mounted on a rotor extension and rotatably driven therefrom.

Figures 3, 4:
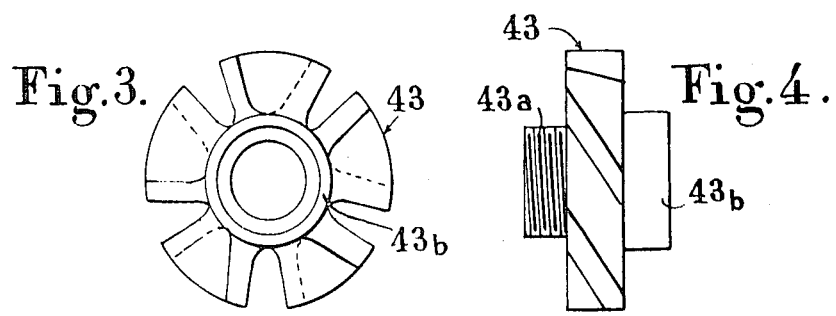
FIG. 3 is a front view showing a propeller comprising five movable blades mounted on a cylindrical hollow hub.
FIG. 4 is a side elevational view of the propeller shown in FIG. 3.

The projecting central hub 28 rigid with the movable plate 3 has an outer extension consisting of a tubular internally screw-threaded portion 42 engaged by a screw-threaded socket 43a constituting the extension, on one side, of a first propeller 43. The hub of this propeller has an extension, on the other side, in the form of an internally screw-threaded socket 43b (FIGS. 3 and 4). Another propeller 44 similar to said propeller 43 is mounted in the same fashion on the first propeller 43 and comprises on one side a screw-threaded socket 44a screwed in the tapped hub 43b and on the other side a tapped socket 44b engaged by an externally screw-threaded socket 45a of a third propeller 45. The three propellers 43, 44 and 45 are identical and correspond to the single propeller designated by the reference numeral 32 in FIG. 1.

A tapered cap 46 is secured to the third propeller 45 by means of a screw-threaded socket 46a screwed in the tapped socket 45b of propeller 45. The hubs of the three propellers 43, 44 and 45, and the cap 46, which are thus secured to one another and properly aligned, provide an inner cylindrical cavity 47 coaxial to the rotor axis 4.

A tube 48 extends inside the cylindrical cavity 47 to within a short distance from said cap 46 and is connected to a source of cooling fluid in order to introduce this fluid into the end of the cavity 47 which is adjacent to cap 46. This cooling fluid may consist of fresh air, thus permitting of dispensing with the use of seals or packings between the inner tube 48 and rotor 3, any leaking air escaping to the atmosphere.

Three sets of counter-blades 49, 50 and 51 are housed in the cavity 25 of the stator which opens into the die 26. These three sets of counter-blades are identical and for example the assembly 49 (FIGS. 5 and 6) comprises an external ring 49a from which a plurality of counter-blades 49b project radially inwards. The set of counter-blades 49 is disposed between the blades 29 of hub 28 and the propeller 43; the next set of counter-blades 50 is disposed between the propellers 43 and 44 and the last set 51 is disposed between the propellers 44 and 45.

The relative spacing between the sets of counter-blades 49, 50 and 51 is maintained by means of a pair of cylindrical distance-pieces 52 and 53 and a ring 54 screwed in a tapped bore formed at the end of extension 24 of stator 2 locks the distance pieces 52 and 53 together with the sets of counter-blades 49, 50 and 51. Besides, these counter-blade assemblies are held in fixed positions by means of studs, for example of the type shown at 49c in FIGS. 5 and 6, these studs rigid with rings such as 49a engaging corresponding holes provided in said distance-pieces 52 and 53.

The external extension 24 of stator 2 is also screw-threaded at its end in order to secure the die 26 hollowed and tapped to this end on its inner face.

Of course, the method of mounting the propellers or counter-blades which is described hereinabove with reference to the drawing should not be construed as limiting the scope of the invention since various other known and conventional means such as screws, keys, etc. may be substituted therefor. Similarly, it would not constitute a departure from the scope of the invention to provide different means for driving the rotor. On the other hand, the propeller system may also be cooled in case the motion imparted to the propellers differs from that imparted to the rotor; this feature can be obtained by simply using a hollow rod extending through the rotor for securing these propellers.

In order better to illustrate the improved rotary-plate extruding machines of this invention, typical exemplary forms of embodiment thereof will now be described with reference to the attached drawings.

EXAMPLE 1

The rotary-plate extruder utilized is the one illustrated in FIG. 1 and described hereinabove. The diameter of rotor 1 is 180 mm. This rotor carries two annular rows of movable blades 22, 23 and the stator 2 carries two annular rows of stationary blades 20, 21. The width of the gap 13 increases from 5 mm. at the outer periphery to 11 mm. at the level of the rotor projection 28.

A propeller 32 independent of the rotor is mounted on the rotor projection 28. The propeller has a 40-mm. diameter and comprises five blades having a radial length of 10 mm. and 80-mm. pitch, the axial length of these blades being 10 mm. The velocity of rotation of propeller 32 is independent of that of rotor 3. The set of counter-blades 35 comprises three blades having an axial length of 5 mm.

The tests are carried out by comparison, with and without the propeller 32 and the set of counter-blades 35.

A wire-extrusion die 26 having a cross-sectional passage area of 30 square millimeters at the outlet is secured to the stator 2 in alignment with the projection 28 of rotor 3 and with propeller 32. A small aperture was formed just after the bladed portion 32 for measuring by conventional means the pressure obtaining in this section of the apparatus.

The plates 2 and 3 are heated by means of electric resistances to a temperature of 180° C. The die 26 is heated to 180° C.

A mixture containing 100 parts of a commercial PVC resin prepared according to the so-called "mass" process (AFNOR viscosity=80) and 2 parts of a tin thioglycolate stabilizer is introduced into the feed hopper 17.

The rotor 3 is started at the speed of 65 r.p.m., then the speed of propeller 32 is varied without varying the rotor speed, and the output and temperature of the material to be extruded are read, together with the pressure prevailing in the die. The results are summarized in the following table:

TABLE 1

|  | Output (kg./hr.) | Temperature (° C.) | Pressure Bars | Pressure P.s.i. |
|---|---|---|---|---|
| Without propeller 32 | 22.5 | 208 | 21 | 305 |
| With propeller 32 driven at r.p.m.: |  |  |  |  |
| 30 | 20.5 | 202 | 22 | 319 |
| 50 | 23.0 | 202 | 23 | 334 |
| 65 | 24.5 | 208 | 24 | 348 |
| 80 | 25.5 | 207 | 25 | 362 |
| 100 | 29.0 | 208 | 26 | 377 |
| 120 | 30.5 | 206 | 27 | 392 |
| 150 | 32.0 | 203 | 28 | 406 |

The rods thus obtained are properly gelled and have a slightly yellow colour.

EXAMPLE 2

In the same assembly as described in Example 1 the movable bladed wheel of propeller 32 also described therein and denoted "propeller 1" is replaced successively by two other propellers having different geometrical characteristics:

| Propeller No. | Blades Radial height (mm.) | Pitch (mm.) | Axial length (mm.) |
|---|---|---|---|
| 1 | 10 | 80 | 10 |
| 2 | 10 | 32 | 10 |
| 3 | 10 | 32 | 32 |

The diameter of these propellers is 40 mm. in all cases. The fixed blades wheel constituting the set of counter-blades 35 is left unchanged.

The same procedure and mixture as in Example 1 are used. The results obtained are summarized in the following table:

TABLE 2

| Propeller speed, r.p.m. | Propeller 1 Output, kg./hr. | ° C. | Pressure (bars) | Propeller 2 Output, kg./hr. | ° C. | Pressure (bars) | Propeller 3 Output, kg./hr. | ° C. | Pressure (bars) |
|---|---|---|---|---|---|---|---|---|---|
| 30 | 20.05 | 202 | 22 | 20.5 | 203 | 22.5 | 15.0 | 208 | 16 |
| 50 | 23.5 | 202 | 23 | 23.5 | 207 | 23.5 | 21 | 208 | 20 |
| 65 | 24.5 | 208 | 24 | 26.0 | 205 | 25 | 26.0 | 209 | 30 |
| 80 | 25.5 | 207 | 25 | 27.5 | 205 | 26.5 | 26.5 | 204 | 32 |

As in Example 1, the rods are gellified, homogeneous but slightly yellowish.

EXAMPLE 3

The rotary-plate extruder utilized in this case is the one partially illustrated in FIG. 2; it comprises three stages of propellers rigid with rotor 3. Each stage comprises a fixed-blade wheel 49, 50 and 51 and a movable-blade wheel 43, 44 and 45 of the type of propeller No. 1.

To reduce the temperature of the extrusion material the projection 28 of the rotor and the propellers 43, 44 and 45 are cooled by using a jet of fresh air directed to the bottom of the cylindrical portion supporting the propellers, this portion being in this case hollow as illustrated in FIG. 2. Similarly, the central area of stator 2 is cooled by a coil pipe 40 (FIG. 1) surrounding same and in which cold water is circulated.

The outer periphery of stator 2 as well as that of rotor 3 are heated to 170° C., and the die 26 is heated to 190° C.

The same mixture as in Examples 1 and 2 is introduced into the feed hopper.

The results thus obtained are shown in the following table:

TABLE 3

| Rotor speed (r.p.m.) | Output, kg./hr. | Temperature, ° C. | Pressure Bars | P.s.i. |
|---|---|---|---|---|
| 65 | 20.5 | 182 | 35 | 508 |
| 90 | 32.0 | 190 | 40 | 580 |
| 120 | 43.0 | 190 | 45 | 653 |

The resulting rods are perfectly gelled and transparent.

What we claim is:

1. An extruder comprising a rotary plate adapted to revolve about a horizontal axis, means for rotatably driving said rotary plate, a stationary stator plate registering with said rotary plate, at least one circular set of movable blades carried by said rotary plate, at least one circular set of stationary blades carried by said stator plate, said stator plate and rotary plate forming therebetween a gap into which the material to be worked and extruded is adapted to be fed, a cavity formed in the central portion of said stator plate, a central projection formed on said rotary plate which registers with said cavity, a die mounted on the central cavity of said stator plate, a plurality of multi-blade propellers mounted in said central stator cavity, said propellers being coaxial with said rotary plate and being secured to one another and also to said central projection of said rotary plate, each propeller comprising a hollow hub, a cylindrical cavity formed by the successive inner spaces of said hollow hubs, a cap sealing the end of said cylindrical cavity and a cooling device housed in said cylindrical cavity, and means for rotatably driving said propellers, the blades of said propellers being inclined in order to force said material to be extruded towards the die during the propeller rotation.

2. An extruder as set forth in claim 1, which comprises a plurality of counter-blade assemblies mounted in said central cavity of the stator plate, each counter-blade assembly comprising an external ring member and blades extending from said ring member and directed towards the axis, and annular distance-pieces separating said counter-blade assemblies whereby the stationary blades of said counter-blade assemblies are disposed between the blades of the various movable propellers.

References Cited

UNITED STATES PATENTS

| 2,200,997 | 5/1940 | Royle | 18—12 |
| 2,713,698 | 7/1955 | Danby et al. | 18—12 |
| 3,262,154 | 7/1966 | Valyi | 18—12 |
| 3,411,180 | 11/1968 | Le Doux | 18—12 |

J. SPENCER OVERHOLSER, Primary Examiner

L. R. FRYE, Assistant Examiner

U.S. Cl. X.R.

18—12 SB; 241—246